United States Patent

[11] 3,598,088

| [72] | Inventors | Jim H. Bowman<br>2052 E. Second St., Fremont, Nebr. 68025;<br>Ralph L. Bowman, 1020 E. 11th St.,<br>Emporia, Kans. 66801; Keith A. Moeller,<br>Hooper, Nebr. 68031 |
|---|---|---|
| [21] | Appl. No. | 777,718 |
| [22] | Filed | Nov. 21, 1968 |
| [45] | Patented | Aug. 10, 1971 |

[54] LIVESTOCK DIP APPARATUS
7 Claims, 7 Drawing Figs.

| [52] | U.S. Cl. | 119/158, 119/29 |
|---|---|---|
| [51] | Int. Cl. | A01k 29/00, A61d 11/00 |
| [50] | Field of Search | 119/158, 29 |

[56] References Cited
UNITED STATES PATENTS

| 748,829 | 1/1904 | Winnie | 119/158 |
|---|---|---|---|
| 786,089 | 3/1905 | Bennett | 119/158 |
| 1,207,815 | 12/1916 | Strong | 119/158 |
| 2,848,977 | 8/1958 | Prestrud et al. | 119/158 |

*Primary Examiner*—Aldrich F. Medbery
*Attorney*—Henderson and Strom

ABSTRACT: A livestock dip apparatus having an on-ramp, a frame, a tank disposed under the frame, a vertically movable cage disposed in the frame and over the tank, hydraulic means for raising and lowering the cage into and out of the tank, and a combination drain basin and off-ramp. The cage has at least one swingable door hingedly secured thereto which is operable to agitate the solution contained in the tank, and an emergency hatch formed in the roof to reach the livestock in event of failure of the raising and lowering means.

INVENTORS
JIM H. BOWMAN
RALPH L. BOWMAN
KEITH A. MOELLER
BY
Henderson & Strom
ATTORNEYS

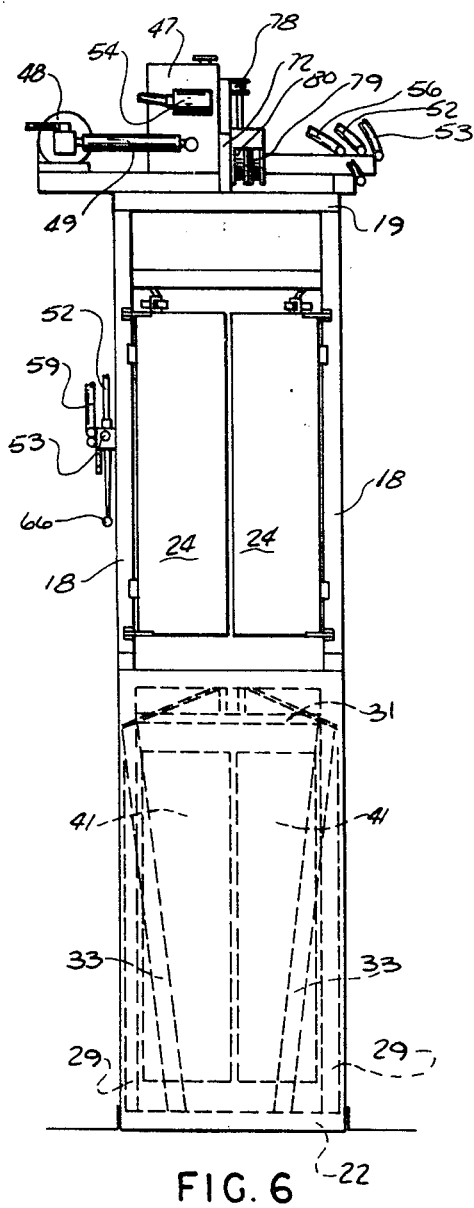
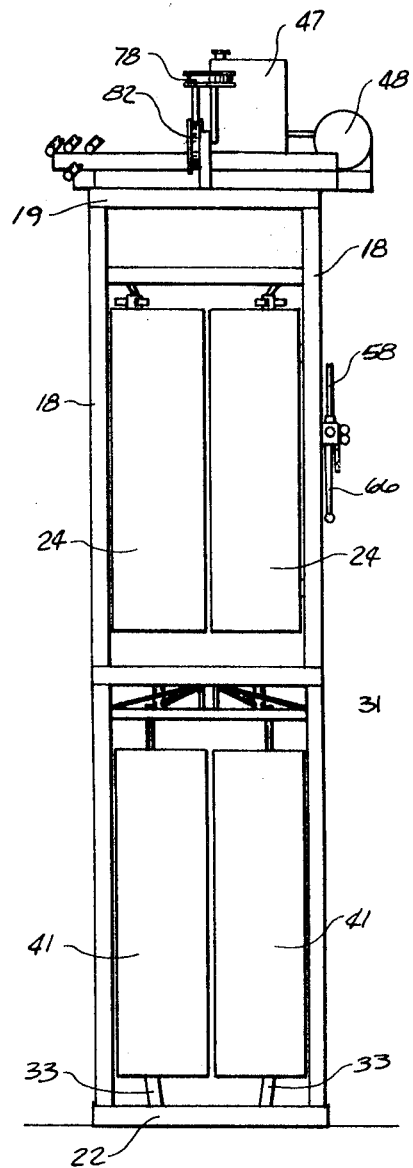
FIG. 6
FIG. 7
INVENTORS
JIM H. BOWMAN
RALPH L. BOWMAN
KEITH A. MOELLER
BY
ATTORNEYS

LIVESTOCK DIP APPARATUS

BACKGROUND OF THE INVENTION

This invention relates to a livestock dip apparatus for dipping livestock in insecticides for the eradication of various pests and diseases to which they are subjected.

In common practice, livestock are driven into elongated tanks containing an insecticide solution and required to swim through the insecticide solution to an exit ramp. Also several dip tank apparatuses have been provided which have vertically movable cages into which an animal is driven. The cage with the animal therein is lowered into and out of a tank containing an insecticide solution.

The common practice described hereinabove has an inherent disadvantage in that the animal could drown or considerable manpower is required to prevent drowning, furthermore the animal may keep his head out of the solution, thus receiving only a partial treatment. The developments in dip tank apparatuses have not overcome the problem of drowning, because the mechanism used to raise and lower the cage often breaks down and the animal is retained in a submerged position. Many animals subjected to this treatment have a value in excess of $100,000, thus every means available must be utilized to protect against loss through drowning or inadequate administration of the insecticide solution.

Another problem inherent in both of the above systems relates to the insecticide solution. The solution is not homogenized and if not in continuous use the insecticide separates from the diluent. Therefore, after a short nonuse of the apparatus, it is necessary to agitate or stir the contents in the tank before use to provide maximum effectiveness of the solution and to prevent injury to the animal because of an improperly mixed solution.

Several U.S. Pats. have issued in this art, i.e., Nos. 412,815; 494,265; 533,151; 606,946; 663,417; 780,011 and 2,848,977; however the maintenance or method of maintaining a mixed solution has not been shown or provided, a fail-safe system of preventing a drowning is not provided, and only crude methods of raising and lowering the cage are provided, thus failing to protect the animal because of the possibility of malfunction and breakdown.

SUMMARY OF THE INVENTION

This livestock dip apparatus of this invention provides an apparatus comprising an on-ramp; a frame; a tank for containing a fluid disposed below the frame; a vertically movable cage, the cage having at least one swingable door mounted on the exit end thereof and an openable hatch disposed on the top thereof for reaching and grabbing the head of the animal to prevent drowning in event of malfunction, and the frame having a pair of swingable gates mounted on the entrance end thereof; hydraulic means operable to raise and lower the cage into the tank and to open and close both the gates and doors; and a combination off-ramp and drain basin, the drain basin having openings to allow the solution to either flow back into the tank or to drain away from the tank.

An advantage of this invention is the provision of an improved livestock dip apparatus.

Another advantage of this invention is the provision of a livestock dip apparatus having an improved lowering and raising mechanism, thus preventing the accidental freezing of the cage in the lowered position.

A further advantage of this invention is to provide a livestock dip apparatus wherein the apparatus also serves as a stirring or mixing device for keeping the insecticide in solution.

Yet another advantage of this invention is the provision of a livestock dip apparatus having a fail-safe system for the prevention of an accidental drowning of an animal being dipped.

Still another advantage of this invention is to provide a livestock dip apparatus which has a drain basin for recapturing the solution after the animal has been dipped.

Yet a further object of this invention is the provision of a livestock dip apparatus which can either be portable or a permanent installation, which is economical to manufacture, rugged in construction and extremely effective in use.

These advantages and other features of this invention will become more readily apparent upon reference to the following description when taken in conjunction with the accompanying drawings of a preferred embodiment of the invention.

BRIEF DESCRIPTION OF THE DRAWINGS

FIG. 6 is a front elevational view thereof; and

FIG. 7 is a rear elevational view thereof.

Figure 1:
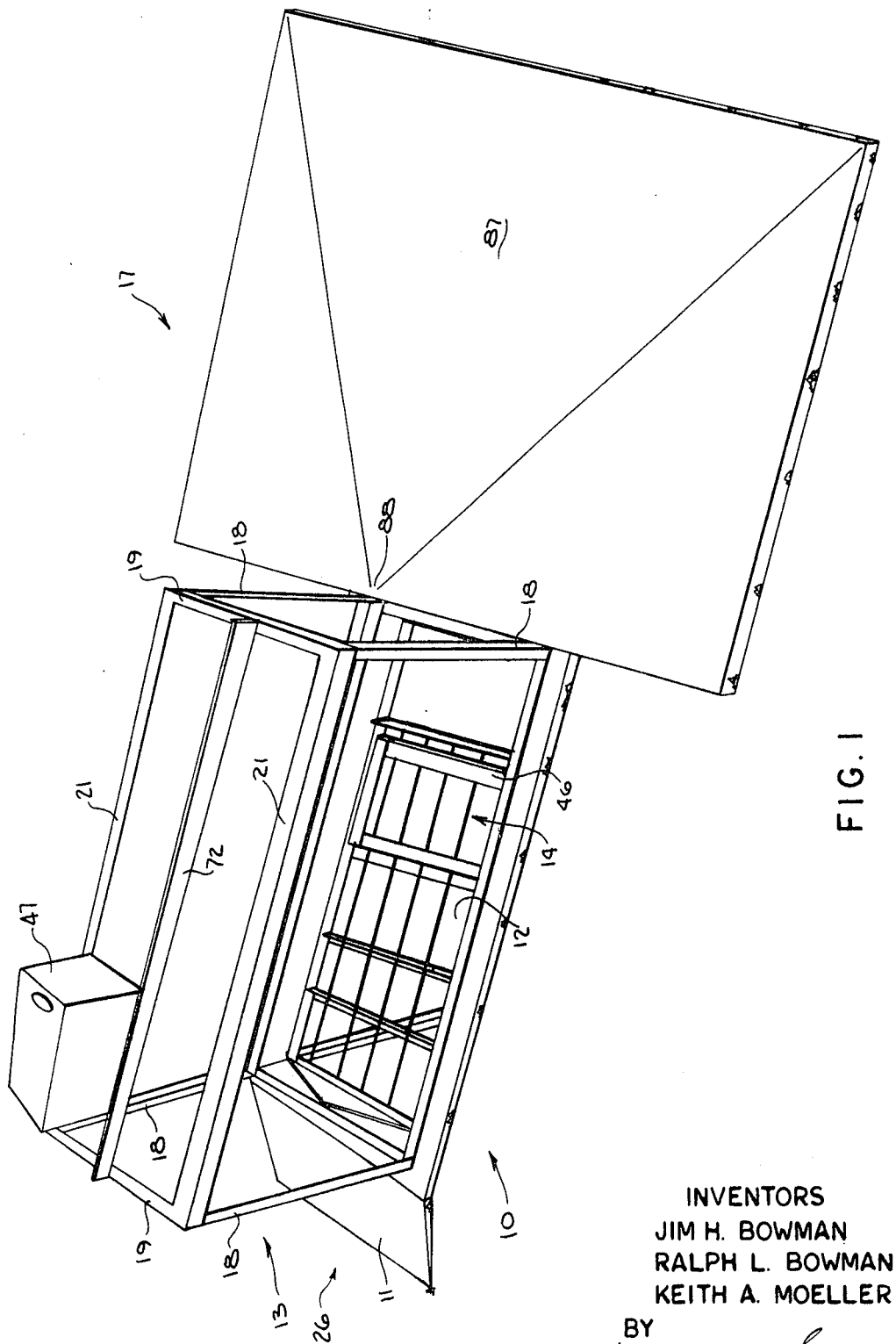
FIG. 1 is a perspective view of the livestock dip apparatus of this invention.
Figure 2:
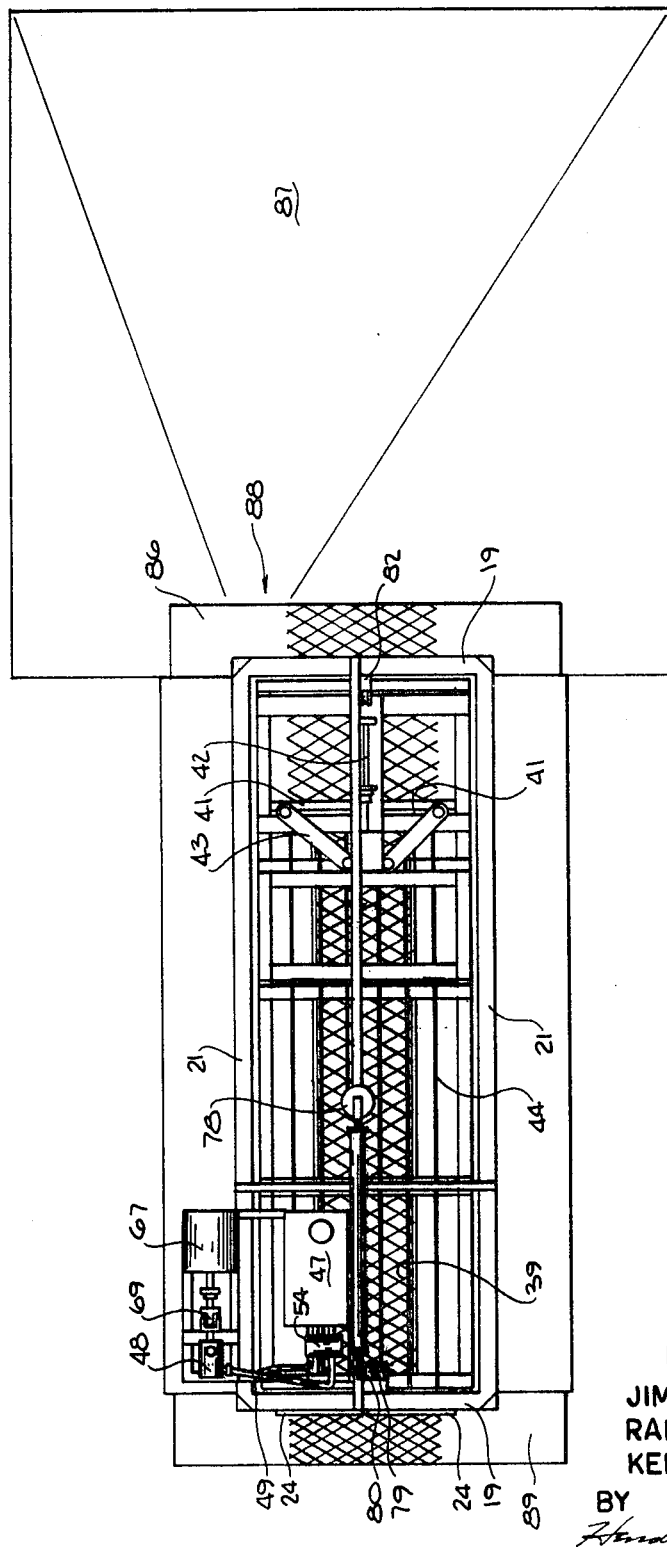
FIG. 2 is a top plan view thereof.

Referring now to the drawings, and particularly to FIG. 1, the livestock dip apparatus of this invention is indicated generally at 10. The apparatus comprises an on-ramp 11, a tank 12 disposed proximate the on-ramp, a frame 13 disposed over the tank, a vertically movable cage 14 disposed in the frame, a hydraulic and pulley system 16 (FIGS. 2 & 5) for raising and lowering the cage 14 out of and into the tank, and a combination drain basin and off-ramp 17 disposed proximate the frame and opposite the on-ramp.

The frame 13 (FIGS. 5 & 6) includes four upright angle irons 18 mounted at substantially the corners of the frame and interconnected with end, horizontally disposed members 19 and side, horizontally disposed members 21, thus forming a substantially open frame. The bottom ends of the posts 18 are disposed at the bottom of the tank 12 and interconnected by lower side, horizontally disposed members 22 and lower end, horizontally disposed members 23. It is possible that the lower portion of the frame disposed within the tank could be eliminated with the lower side and end members 22 and 23 resting on and secured to the top edge of the tank; however the tank corners would have to be coplanar with the irons 18 so as to serve as slideways for the corner posts of the cage. A superstructure is secured to the top of the frame for supporting the hydraulic system 16 and will be described hereinafter.

Figure 5:
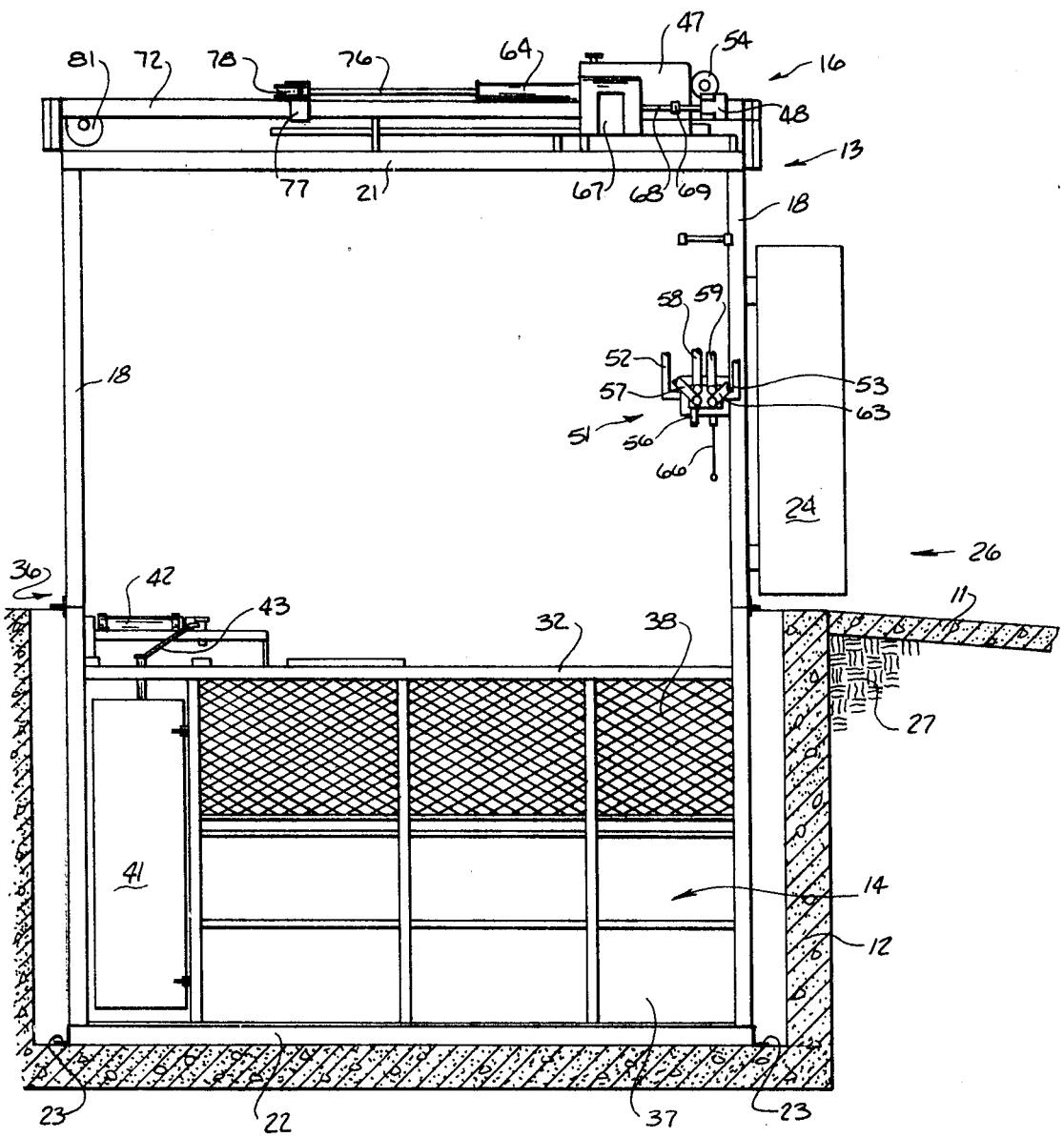
FIG. 5 is a side elevational view of the invention.

A pair of hydraulically operated swingable entrance gates 24 are hingedly connected transversely of the cage to the entrance end 26 of the frame 13 and open outwardly as best viewed in FIG. 5.

The tank 12 comprises a fluid tight structure open at the top thereof. The tank, for a permanent installation could be formed from concrete or the like and is disposed in the ground with the top thereof proximate the surface of the ground 27 (FIG. 5). In a portable structure, the tank is formed from steel, or the like, and is mountable on the bed of a truck (not shown).

Figure 3:
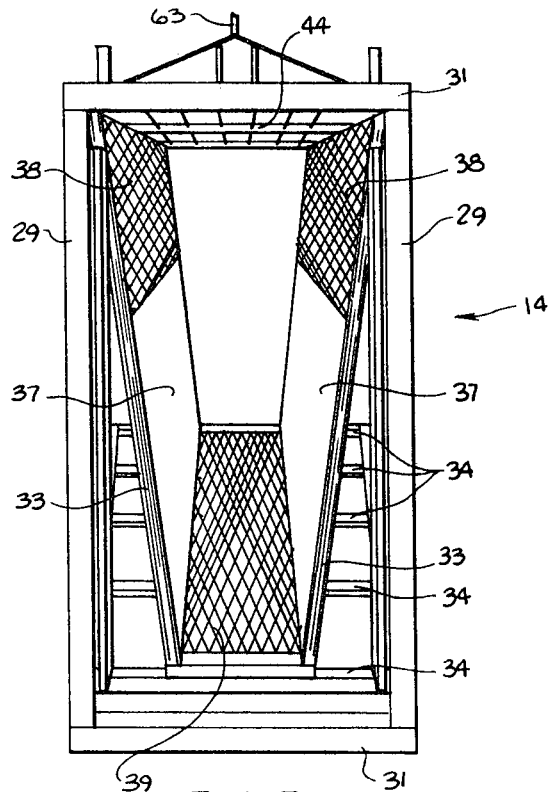
FIG. 3 is a perspective view of the cage.

The cage 14 (FIGS. 3 and 7) mounted inside the frame 13 comprises a frame structure, adapted to move vertically within and to slide with the upright angle irons 18, having four upright posts 29. The posts 29 are interconnected on both ends by horizontal end and side members 31 and 32. Disposed within the frame structure are a pair of longitudinally aligned sloping walls 33 supported on a plurality of cross braces 34 secured between the lower side members 32. The walls 33 terminate on the entrance end proximate the upright posts 29 while on the exit end 36 they terminate a spaced distance or are inwardly spaced from the upright posts as best viewed in FIG. 5. Covering the lower portion of each of the sidewalls is a kickplate 37, while the upper portion is covered by a screen 38. Interconnecting the lower, converging ends of the sidewalls 33 is a perforated bottom wall 39.

Hingedly mounted on the exit end 36 of the cage 14 are a pair of transversely disposed hydraulically actuated doors 41. It will be noted in FIG. 5 that the doors 41 can be opened when the cage 14 is in a lowered position. A double acting hydraulic cylinder 42 is mounted on the top of the cage over the doors 41 and connected to the latter by a linkage 43. The top of the cage is provided with a screened roof 44 having an openable hatch 46 (FIG. 1) disposed therein proximate the door.

The hydraulic system 16 (FIGS. 2 and 5) comprises an oil reservoir 47 fluidly connected to a pump 48 by a fluid line 49, and to a set of control valves 51 by a fluid line 52. The discharge ends of the valves 51 are fluidly connected by a fluid line 53 to the pump, with an oil filter 54 disposed in the fluid line 52 for filtering the oil prior to return thereof to the reservoir. A first pair of fluid hoses 56 and 57 connect the control valve 51 to the hydraulic cylinder 42 on the cage, a second set of fluid hoses 58 and 59 connect the control valve 51 to a second, double acting hydraulic cylinder 61, connected by a linkage 62 to the gates 24, and a third hose 63 fluidly connects the control valve 51 to a single acting hydraulic cylinder 64 which controls the lifting of the cage 14.

A manually operated pump (not shown) having a pump arm 66 (FIG. 5) is connected to the control valve 51 for manually pumping oil into the hose 63 in the event of a malfunction of the pump. A motor 67 (FIG. 2) is connected by a shaft 68 and universal joint 69 to the pump.

Figure 4:
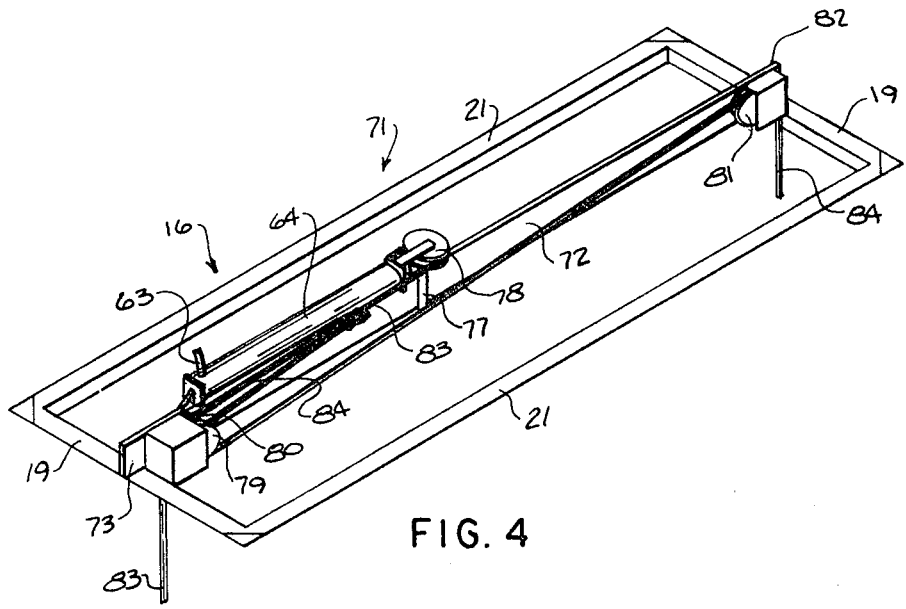
FIG. 4 is a perspective view of the hydraulic system.

The hydraulic system 16 (FIGS. 4 & 5) further includes a raising and lowering mechanism 71 mounted on the superstructure of the frame and comprises a longitudinally disposed rail 72 secured at opposite ends to the horizontal end members 19 of the frame 13. The cylinder 64 is secured at the base end thereof to the rail 72 one end 73; and a piston rod 74, slidably mounted in the cylinder 64, is secured at its free end 76 to a bracket 77. The bracket 77 is slidably mounted on the rail 72. A first sheave 78 is attached to the piston end 76 and bracket 77. Attached to the rail 72 adjacent the rail one end 73 are a second and a third sheave 79 and 80, and a fourth sheave 81 is secured to the other end 82 of the rail 72. A cable 83 is secured on the one end thereof to the rail one end 73, passed around the first sheave 78, back over the second sheave 79, and secured on the other end to the center of the upper end member 31 disposed immediately therebelow. A second cable 84 is secured at one end thereof to the first cable 83 proximate the second and the third sheaves 79 and 80, passed over the third sheave 80, back over the fourth sheave 81, and secured on the other end to the center of the upper end member 31 disposed immediately therebelow.

The raising and lowering mechanism 71 is operable to raise and lower the cage 14 in the frame 13. To raise the cage, oil under pressure is forced into the cylinder 64, thus pushing the rod 74 outwardly therefrom along the rail. As the rod moves, the cables pass through the sheaves and the cage is raised. To lower the cage, the control valve 51 is manually reversed and the oil is forced from the cylinder by the weight of the cage and the rod slides into the cylinder, thus reversing the process outlined hereinabove.

The combination drain basin and off-ramp 17 (FIGS. 1 and 2) comprises an off-ramp 86 formed from a perforate material, and a drain basin 87. The drain basin is formed to provide a sloping floor wherein any fluid deposited thereon will flow toward a point 88 adjacent the tank. A first valved fluid passage (not shown) connects the point 88 to the tank 12. A second valved passage (not shown) connects the point 88 to the exterior of the basin, thus allowing any fluid deposited therein to drain off.

In operation, the tank is filled with a diluent and an insecticide. Prior to the dipping of an animal, the cage 14 is lowered into the tank and the doors 41 acting as an agitator are caused to be repeatedly moved from a closed to an open position for the purpose of mixing the solution of diluent and insecticide. After the solution is adequately mixed, the door is closed and the cage is raised. The gates 24 are opened and an animal is driven up the on-ramp 89 and into the cage. The gates are closed and the cage is lowered into the tank with the solution therein flowing through the perforate floor and around the animal. After the animal has been effectively treated, the cage is raised and the gates 41 are opened to allow the animal to be driven from the cage, down the off-ramp 86 and onto the drain basin 87. The solution which drains from the animal onto the drain basin is allowed to drain through the first valved passage into the tank.

In the event of malfunction of the hydraulic system while the animal is immersed in the solution, the hatch 46 can be opened and the head of the animal can be reached for the purpose of holding same above the solution to prevent drowning. In addition, the manual pump can be operated by activating the arm 66 to force oil into the cylinder 64 thus raising the cage.

If the insecticide does not stay in solution, the cage is lowered and the doors actuated as described hereinabove thus always maintaining a properly mixed solution prior to the dipping process.

Although a preferred embodiment of the invention is illustrated and described hereinabove, it is to be remembered that various other modifications and alternate constructions can be made thereto without departing from the true scope and spirit of the invention as defined in the appended claims.

We claim:

1. A livestock dip apparatus comprising:
a tank open at the top thereof, said tank adapted to contain a fluid;
a frame disposed over said tank;
a vertically movable cage disposed in said frame; said cage having at least one open end, sidewalls and a bottom wall;
a door hingedly mounted in said cage inwardly of said open end thereof and constituting an extension of the sidewall of said cage, means to swing said door from a closed position disposed transversely of said cage to an open extended position wherein when said door is in said open position it does not extend outwardly of said cage;
power means mounted on said frame and connected to said cage, said power means operable to lower and raise said cage and to swing said door when said cage is in the lowered position from said closed position to said open position wherein when said cage is lowered into said tank the swinging of said door from said closed position to said open position agitates the fluid in said tank.

2. A livestock dip apparatus as defined in claim 1 wherein said frame is open ended and has a gate hingedly mounted on one end thereof, said cage is open ended, and said cage door is disposed proximate said frame other end.

3. A livestock dip apparatus as defined in claim 2 wherein said cage has a roof attached thereto, said roof having an openable hatch formed therein proximate said door.

4. A livestock dip apparatus as defined in claim 2 wherein said power means comprises a first hydraulic cylinder mounted on said cage and operably connected to said door for opening and closing said door, a second hydraulic cylinder mounted on said frame and operably connected to said gate for opening and closing said gate, a third hydraulic cylinder mounted at one end thereof to said frame and operably connected to said cage for raising and lowering said cage, and an automatic pump means and hydraulic system fluidly connected to said cylinders for selectively actuating said cylinders.

5. A livestock dip apparatus as defined in claim 4 wherein said means further includes a manually operated pump fluidly connected to said hydraulic system for actuating said third cylinder.

6. A livestock dip apparatus as defined in claim 5 and including an on-ramp secured to said frame one end, an off-ramp secured to said frame other end, and a drain basin disposed proximate said off-ramp.

7. A livestock dip apparatus as defined in claim 6 and including further drain means fluidly interconnecting said basin and said tank, and fluidly interconnecting said basin to a drain area, said drain means selectively operable to drain fluid from said basin to said tank and to said area.